(12) United States Patent
Kim et al.

(10) Patent No.: US 8,162,555 B2
(45) Date of Patent: Apr. 24, 2012

(54) PRINTING PINS HAVING SELECTIVE WETTABILITY AND METHOD OF MAKING SAME

(75) Inventors: Chang-Jin Kim, Beverly Hills, CA (US); Jane G. Tsai, Corona, CA (US)

(73) Assignee: The Regents of the University of California, Oakland, CA (US)

( * ) Notice: Subject to any disclaimer, the term of this patent is extended or adjusted under 35 U.S.C. 154(b) by 1374 days.

(21) Appl. No.: 11/458,981

(22) Filed: Jul. 20, 2006

(65) Prior Publication Data

US 2007/0017403 A1    Jan. 25, 2007

Related U.S. Application Data

(60) Provisional application No. 60/701,151, filed on Jul. 21, 2005.

(51) Int. Cl.
*B43K 5/02* (2006.01)

(52) U.S. Cl. ........................................ 401/222

(58) Field of Classification Search .................. 401/221, 401/222
See application file for complete search history.

(56) References Cited

U.S. PATENT DOCUMENTS 7,147,988 B2 * 12/2006 Suzuki ...................... 430/271.1
2003/0148308 A1 * 8/2003 Chappa et al. .................... 435/6
2006/0021150 A1 * 2/2006 Hu et al. ....................... 8/115.51
2006/0056904 A1 * 3/2006 Haselton et al. ............. 401/198

OTHER PUBLICATIONS

J. Tsai at al., A Silicon-Micromachined Pin for Contact Droplet Printing, IEEE Conf. MEMS, Kyoto, Japan, pp. 295-298, Jan. 2003.
J. Tsai et al., A Silicon Micromachined Pin for Contact Droplet Printing, IEEE EMBS/BMES Cong., Houston, TX, pp. 1632-1633, Oct. 2002.

* cited by examiner

*Primary Examiner* — Huyen Le
(74) *Attorney, Agent, or Firm* — Vista IP Law Group LLP

(57) ABSTRACT

A method of forming a printing pin includes providing a printing pin having an exterior surface and an interior surface that defines a lumen or capillary tract. The pin is treated to render the exterior and interior surfaces hydrophilic. The lumen or capillary tract is filled with a blocking material. The exterior surface of the pin is coated with a hydrophobic material. The blocking material is then removed. The method produces a pin with selective wetting properties. The modified pins reduce solution or reagents use because no excess liquid is picked up on the exterior surface during loading. As a result, no pre-printing operation is needed to remove this excess liquid. Because no pre-printing operation is needed, the pins produce shorter printing times. In addition, due to improved control of liquid loading volume, it is possible to obtain smaller spots as well as more spots in a given run.

17 Claims, 5 Drawing Sheets

PRINTING PINS HAVING SELECTIVE WETTABILITY AND METHOD OF MAKING SAME

REFERENCE TO RELATED APPLICATIONS

This application claims priority to U.S. Provisional Patent Application No. 60/701,151 filed on Jul. 21, 2005. U.S. Provisional Patent Application No. 60/701,151 is incorporated by reference as if set forth fully herein.

STATEMENT REGARDING FEDERALLY SPONSORED RESEARCH AND DEVELOPMENT

The U.S. Government may have a paid-up license in this invention and the right in limited circumstances to require the patent owner to license others on reasonable terms as provided for by the terms of grant number CMS-99-80874 awarded by the National Science Foundation.

FIELD OF THE INVENTION

The field of the invention generally relates to devices used to transfer fluids from a source to a printing surface. In particular, the field of the invention relates to printing pins having differential wetting properties on the inside and outside of the printing pins. The printing pins formed in accordance with the invention offer more effective fluid transfer including superior control of transfer volume and spot size.

BACKGROUND OF THE INVENTION

There is a growing demand for devices that are able to generate microscopic-sized liquid droplets, and in many cases to print onto solid surfaces. As a biomedical example, microarray technology has been developed to detect and analyze proteins and/or nucleic acid material (e.g., DNA or RNA) within a sample. These devices utilize highly parallel hybridization assays using an array of testing sites with deposited samples on a chip or slide. This technology has been useful in gathering information for genetic screening and expression analysis, as well as the detection of single nucleotide polymorphisms (SNPs). In addition, microarray technology can be utilized in other areas such as pharmacology research, infectious and genenomic disease detection, cancer diagnosis, and proteonomic research.

These microarray devices, however, require the formation of high-density hybridization sites or spots on a solid surface. The high-density array of test sites is generally formed using photolithographic patterning techniques, mechanical microspotting, or inkjet-like printing. The photolithographic method fabricates microarrays through on-chip chemical synthesis of DNA molecules using spatially directed exposure of light to selectively de-protect regions of the substrate. Affymetrix, Inc. of Santa Clara, Calif., for example, has developed this approach. While high-density test sites may be created using this method, there are significant manufacturing costs inherent in this method due to the use of light blocking masks and related lithographic equipment. In addition, lithographic processes, while suitable for large-scale production, is simply too expensive for small or intermediate scale productions.

In yet a second method, inkjet printing techniques are employed that forcibly eject fluid droplets from a printhead structure. The ejected droplets fly through the air and land on the substrate. While inkjet technology is mature and widely used in the case of traditional inkjet printers (used in the home and in business), the same technology cannot be directly translated into microarray applications. For example, in microarray applications, the droplets contain specific quantities of biological material (e.g., nucleic acids). Unfortunately, the number of samples deposited per area on the surface (i.e., average sample density on a spot) may vary widely because of splashing or spreading of droplets on the printing surface which could result in inconsistent hybridization data being generated.

In a third method, mechanical microspotting is used to print small amounts of solutions onto solid surfaces such as glass, silicon, or plastic substrates to form a testing array. The mechanical microspotting technique utilizes multiple fountain pen-like pins that leave droplets on the solid surface after contact is made between the pen "tip" and the surface. This method is generally simple and inexpensive for making a small number of microarray chips. Unfortunately, after repeated use, the tip of the pin (which is typically stainless steel) tends to deform plastically, thereby resulting in test sites having inconsistent spot size and shapes.

The pins used in microspotting have a capillary tract that contains the liquid. The liquid is dispensed from the capillary upon contact with the printing surface. The precision at which the liquid is retained in or released from the capillary is controlled by a number parameters including, for example, pin surface, print surface, printing speed, and ambient humidity conditions. During the formation of biological microarrays, great care is taken to control these parameters to ensure that the array of spots is formed in a precise and consistent manner.

In conventional pin-based microspotters, the pins are loaded with sample by dipping the tips of the pins into sample wells. Unfortunately, without a distinctive water-repelling property on the surface, excess liquid adheres or "clings" on the exterior surface of the pins. In order to remove this excess liquid, standard protocol requires that the pins undergo a pre-printing operation in which multiple large spots are printed on a dummy surface before printing on the intended printing surface. The pre-printing operation, however, wastes reagents, causes longer print times, and produces irregular sized spots.

Thus, there is a need for a printing pin that is overcomes the disadvantages of pins found in current microspotter devices. In particular, there is a need for a microspotter pin that reduces or eliminates entirely the adherence of residual fluid on the exterior of the printing pin. In this regard, there is a need for a pin design that does not require a pre-printing operation to remove adherent fluid.

SUMMARY OF THE INVENTION

In a first aspect of the invention, a pin that is adapted for use in a microspotter device includes an elongate body having an exterior surface and a lumen contained within the elongate body, the lumen being surrounded by an interior surface. The lumen may take the form of a capillary tract or the like that is used to store or retain fluid during a printing process. The exterior surface of the pin is one of hydrophobic or hydrophilic while the interior surface of the elongate body is the other of hydrophobic or hydrophilic. For example, the exterior surface of the pin may be hydrophobic while the interior surface of the pin is hydrophilic. Alternatively, the exterior surface of the pin may be hydrophilic while the interior surface of the pin is hydrophobic.

In certain aspects of the invention, the hydrophobic nature of the exterior surface (or interior surface) is formed by a coating of hydrophobic material that is applied or grown on the surface of the pin. The pin may be formed from metallic materials such as, for example, stainless steel. Alternatively, the pin may be formed from ceramic materials such as, for example, silicon. The pins may be incorporated into a holder that is then incorporated into a robotic array device.

In another aspect of the invention, a method of forming a printing pin includes providing a printing pin having an exterior surface and an interior surface that defines a lumen. The lumen forms the capillary tract of the pin. The pin is then treated to render the exterior and interior surfaces hydrophilic, if not already hydrophilic enough. The lumen is then filled with a blocking material. The exterior surface of the pin is then coated with a hydrophobic material. The blocking material contained within lumen is then removed.

In another aspect of the invention, a method of forming one or more printing pins includes providing at least one printing pin having an exterior surface and an interior surface that defines a lumen. The lumen forms the capillary tract of the pin. The at least one pin is treated to render the exterior and interior surfaces hydrophilic, if not already hydrophilic enough. The interior and exterior surfaces are coated with a photosensitive material such as a positive photoresist. The exterior surface of the pin is illuminated or otherwise exposed with a light such as ultra violet (UV) light. The exposed photosensitive material is then exposed to a development solution to remove the exposed material on the exterior surface of the at least one pin. The exterior surface of the at least one pin is coated with a hydrophobic material. The remaining photosensitive material inside the pin (i.e., the blocking material) is then removed.

DETAILED DESCRIPTION OF THE PREFERRED EMBODIMENTS

Figure 1:
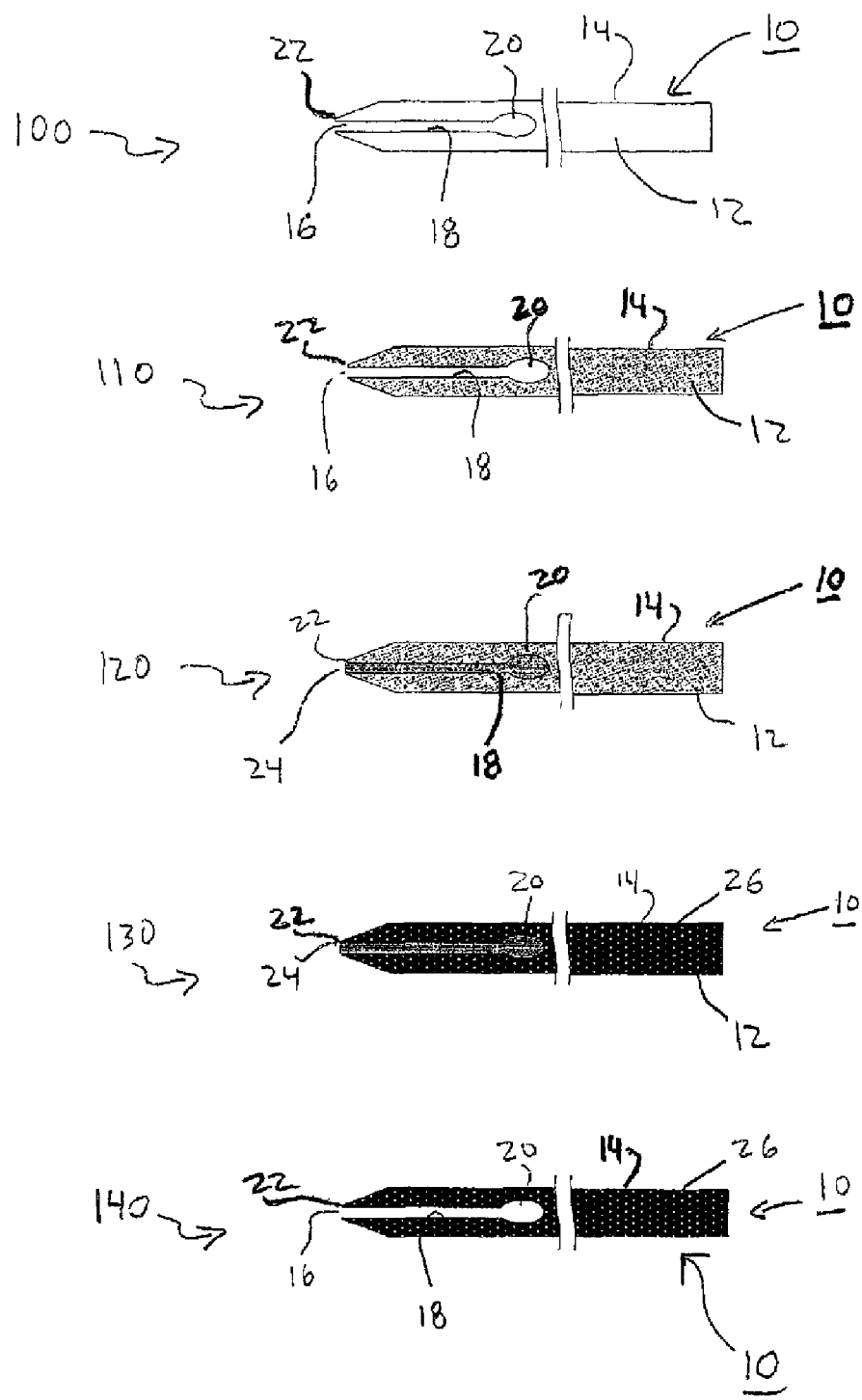
FIG. 1 illustrates a process of forming a printing pin in accordance with one embodiment of the invention.

FIG. 1 illustrates a process for forming a pin 10 having selective wetting properties according to one embodiment of the invention. In step 100, a pin 10 is provided. The pin 10 has an elongate body 12 having an exterior surface 14. A lumen 16 or passageway is formed within the elongate body 12 of the pin 10. The lumen 16 may take the form of a capillary tract or the like that is used to retain (and release) fluid during the printing process. The lumen 16 is surrounded by an interior surface 18 of the pin 10, which, as described below, is imparted with selective wetting properties (e.g., hydrophilic or hydrophobic). The lumen 16 may contain a reservoir 20 or the like that provides additional volume for the storage of fluid.

The pin 10 includes a tip region 22 that is generally tapered (or reduced in size) from the body 12 toward the inlet/outlet region of the lumen 16. The pin 10 (or multiple pins 10) may be dimensioned so that the pin(s) 10 can be mounted within an arrayer device (not shown). Typically arrayer devices are automatically or robotically controlled to fill and dispense fluids from an array of pins 10. Typical dimensions of the pin 10 may include lengths of around 50 mm with a lumen having a length of around 10 mm. In the case of silicon-based pins 10, the pins 10 may have a thickness of 500 µm, a width of 1500 µm, and a tip contact end that is 20 µm by 50 µm. It should be understood, however, that the dimensions described herein are merely illustrative and pins 10 having differing dimensions are contemplated to fall within the scope of the invention.

The pin 10 may be formed from variety of materials. For example, the pin 10 may be micromachined from silicon. In this case, the silicon pin 10 may be fabricated by an etching technique such as deep reactive-ion-etching (DRIE) on a silicon-on-insulator (SOI) wafer. The device layer of the SOI is first etched to define the capillary and printing tip. The SOI wafer is then flipped to expose the handle layer, which is subsequently DRIE etched to define the lumen cavity. The overall structure is then released in buffered hydrofluoric (HF) acid. In another aspect, a silicon pin may also be fabricated from regular silicon wafer rather than SOI by various micromachining techniques including, for example, wet chemical etching, sand blasting, electric discharging machining to define its overall shape.

The pin 10 may also be fabricated using more conventional materials such as metal (e.g., stainless steel). Referring to step 110 in FIG. 1, the pin is then thoroughly cleaned with an oxidizer to render the entire surface (both exterior surface 14 and interior surface 18) hydrophilic. Step 110 may be optional, however, if the exterior 14 and interior surface 18 are already hydrophilic. If the pin 10 is made from silicon, a sulfuric acid/hydrogen peroxide wash solution (e.g., 5:1 by volume) may be used to chemically oxidize the silicon surface to silicon-oxide so as to render the entire pin 10 hydrophilic to water. The metallic pin may also be coated with a hydrophilic layer, or oxidized by treating it in an oxidizer.

According to one aspect of the invention, it is desirable to form a pin 10 with selective wetting properties on the exterior and interior surfaces 14, 18. For example, the pin tip 22 as well as the lumen 16 (interior surface 18) and reservoir 20 (if present) should remain hydrophilic to water, thus allowing capillary force to dominate fluid pickup and delivery. In contrast, the exterior surface 14 of the pin should be substantially hydrophobic to water so as to reduce or eliminate excess water pickup during liquid loading. As explained above, the excess water pickup leads to solution waste and requires a pre-printing operation.

In order to form the hydrophilic interior 18 and hydrophobic exterior 14, the lumen 16 is filled with a blocking material 24 as shown in step 120 of FIG. 1. The blocking material 24 may be formed from a polymer material such as, for example, a photoresist. Generally, the blocking material 24 may be formed from any material that can be selectively removed. As explained below, the blocking material 24 may be removed by an etchant or solution that targets or preferentially dissolves the blocking material 24.

In one aspect of the invention, the blocking material 24 may be loaded into the lumen 16 by a wicking process. For example, blocking material 24 in the form of a liquid may be brought into contact with the tip 22 of the pin 10. Capillary forces will carry the blocking material 24 inward along the length of the lumen 16 and inside the reservoir 20 leaving the exterior surface 14 free of the blocking material 24. For example, if the blocking material 24 is a photoresist, a small drop of photoresist (1 µl) is wicked into the lumen 16 after contacting the tip 22 of the pin 10.

Optionally, the blocking material 24 is then allowed to harden. The blocking material 24 may harden on its own, for example, through a polymerization reaction. Alternatively, the blocking material 24 may harden upon application of heat. For instance, when the blocking material 24 is formed from a photoresist, the blocking material may be hardened by heating the pin in an oven (e.g., 100° C.) for several minutes (e.g., 5 minutes).

Referring now to step 130 in FIG. 1, the pin 10 is then coated with a hydrophobic material 26. Because of the presence of the blocking material 24, the hydrophobic material 26 is only applied to the exterior surface 14 of the pin 10. The particular hydrophobic material 26 used on the pin 10 may be chosen based on one or more parameters including, for example, (1) water repelling ability, (2) degree of interaction with biological materials (e.g., DNA, RNA, etc.), (3) chemical resistance, (4) durability to successive washing and drying processes. Exemplary hydrophobic materials 26 include polytetrafluoroethylene (PTFE including Teflon®), parylene, hexamethyldisilazane (HMDS), and octadecyl trichlorosilane (OTS). The manner in which the hydrophobic material 26 is formed on the pin 10 is dependent upon the material utilized. The hydrophobic material 26 may be applied using dip coating, immersion coating, vapor deposition, or plasma assisted vapor deposition. The hydrophobic material 26 may even be grown directly on the exterior surface 14 using, for example, self-assembled monomer or polymers.

Step 140 of FIG. 1 illustrates the removal of the blocking material 24 from the pin 10. The blocking material 24 may be removed by using a developer or etchant solution that dissolves or otherwise breaks down the blocking material 24. For example, a pin 10 coated with OTS on the exterior surface 14 may be placed into a series of baths containing solution of acetone, methanol, and water to remove the blocking material 24. Once the blocking material 24 is removed (as is shown in step 140), the resultant pin 10 has specifically tailored wetting properties. In particular, the exterior surface 14 of the pin 10 is hydrophobic while the interior surface 18 of the pin 10 (lumen 16 including reservoir 20) are hydrophilic.

At this point, the pin 10 is ready for use. The pin 10 may be mounted within an arrayer device (not shown). Typically, a plurality of pins 10 are loaded into a pin holder (not shown) that is then loaded into a conventional arrayer device. For example, the pins 10 may be loaded into a pin holder of the type disclosed in Tsai et al., *A Silicon-Micromachined Pin For Contact Droplet Printing, IEEE* Conf MEMS, Kyoto, Japan, January 2003, pp. 295-298, which is incorporated by reference as if set forth fully herein.

While the embodiment described above creates a pin 10 having a hydrophilic interior surface 18 and a hydrophobic exterior surface 14, in an alternative embodiment of the invention, the wettability of the surfaces 18, 14 is reversed. In particular, it is contemplated that the interior surface 18 may be hydrophobic while the exterior surface 14 may be hydrophilic. This alternative embodiment may be useful for printing non-aqueous liquids (e.g., oil based droplets). In addition, this alternative embodiment may be useful because it can improve the picking up and printing of bubbles on a print surface in a liquid environment.

Figure 2:
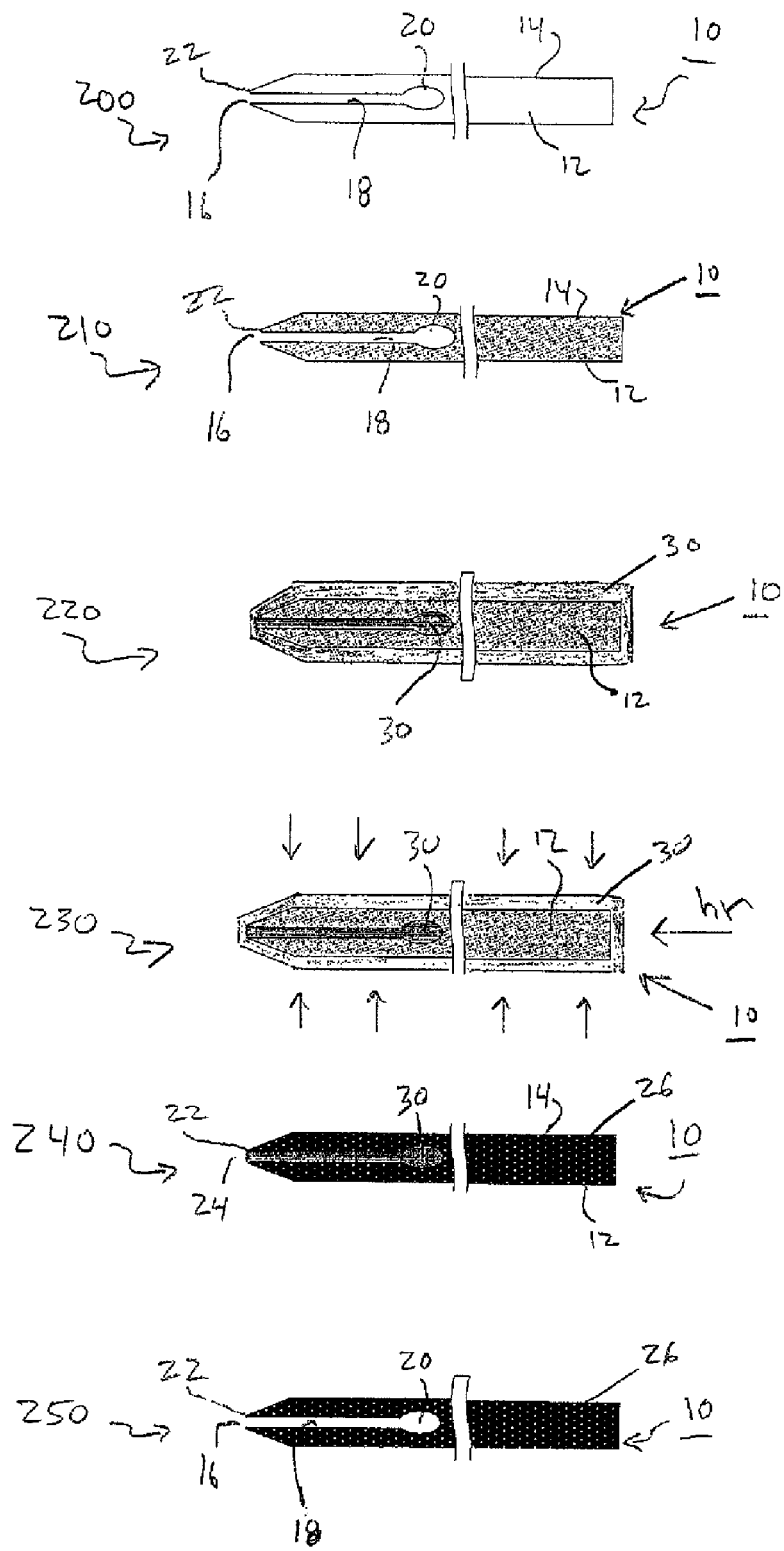
FIG. 2 illustrates a process of forming a printing pin in accordance with another embodiment of the invention.

FIG. 2 illustrates an alternative process of forming a pin 10. In step 200, a pin 10 of the type described herein is provided. Step 200 is identical to step 100 in FIG. 1. Next, as shown in step 210, the pin 10 is then rendered hydrophilic by thoroughly cleaning the same with an oxidizer to render the entire surface (both exterior surface 14 and interior surface 18) hydrophilic (as described above with respect to step 110).

In step 220, the lumen 16 and reservoir 20 along with the exterior surface 14 of the pin 14 are then coated with a positive photosensitive material 30 such as a positive photoresist. A positive photoresist is a photoresist that upon exposure to radiation like UV light undergoes chemical modification such that it becomes more soluble in a subsequently used developer solution. An exemplary positive photoresist includes Shipley SJR 5740 positive photoresist (Shipley Company, Inc., 455 Forest Street. Marlboro, Mass.) although other positive photoresists may also be used. In this embodiment, the positive photosensitive material 30 acts as the blocking material 24 found in the process of FIG. 1. In addition, the positive photosensitive material 30 not only blocks the lumen 16 and reservoir 20, the material 30 is coated on the exterior surface 14 of the pin 10. The positive photosensitive material 30 may need to undergo a short heating (e.g., pre-exposure baking) to solidify the material on the pin 10.

Next, with reference to step 230 in FIG. 2, the pin 10 with the coating of positive photosensitive material 30 is irradiated with radiation (e.g., UV light). The radiation (represented by arrows in step 230) is directed to all of the exterior surface 14 of the pin 10. The positive photosensitive material 30 located within the lumen 16 (and included reservoir 20) is blocked or shaded from the radiation by the body of the pin 10. As a result, only the positive photosensitive material 30 located on the exterior surface 14 of the pin 10 undergoes chemical modification.

With reference now to step 240 of FIG. 2, the pin 10 is then immersed or otherwise covered with a developer solution to remove the chemically modified positive photosensitive material 30. For example, the developer solution for Shipley SJR 5740 maybe a mix of KOH-based solution such as AZ400K or other variations. As explained above, the developer solution preferentially removes those areas of the photosensitive material 30 that were previously exposed to radiation. As a result, the developer solution removes the positive photosensitive material 30 on the exterior surface 14 of the pin 10 but leaves the positive photosensitive material 30 located within the lumen 16/reservoir 20. After removal of the positive photosensitive material 30 from the exterior surface 14 of the pin 10, the pin 10 is then coated with a hydrophobic material 26 as described above with respect to the process shown in FIG. 1.

In step 250, the remaining positive photosensitive material 30 inside the lumen 16 (and optional reservoir 20) is removed from the pin 10. The positive photosensitive material 30 (i.e., blocking material) may be removed by using a solvent (e.g., acetone, methanol, water wash) that dissolves or otherwise breaks down the positive photosensitive material 30. One potential solvent includes AZ400K or other variants. Once the positive photosensitive material 30 Is removed (as is shown in step 250), the resultant pin 10 has specifically tailored wetting properties. For example, the exterior surface 14 of the pin 10 is hydrophobic while the interior surface 18 of the pin 10 (lumen 16 and reservoir 20) are hydrophilic.

As an alternative embodiment, the wetting properties of the exterior surface 14 and interior surface 18 may be reversed. In this embodiment, the exterior surface 14 may be made hydrophilic while the interior surface 18 may be made hydrophobic.

As yet another alternative process of forming a pin 10, the blocking material 24 may be a material that coats a thin layer on the surface. The pin 10 is dipped in such a material 24, so that it forms a thin layer on the exterior surface 14 but fills the lumen 16 by capillary action. When subjected to in a short etching condition, the thin layer on the exterior surface 14 is removed while the material 24 in the lumen 16 remains. The pin 10 is then coated with a hydrophobic material 26 as described above with respect to the process shown in FIG. 1.

In step 250, the blocking material 30 may be removed by using a chemical that dissolves or otherwise breaks down the blocking material 30. Once the positive blocking material 30 is removed (as is shown in step 250), the resultant pin 10 has specifically tailored wetting properties. For example, the exterior surface 14 of the pin 10 is hydrophobic while the interior surface 18 of the pin 10 (lumen 16 including reservoir 20) are hydrophilic.

Experiments were conducted to compare the performance of hydrophobically-coated silicon pins 10 with the performance of an uncoated silicon pin and a commercial stainless steel pin (ArrayI™ CMP4 available from TeleChem International, Inc., Sunnyvale, Calif.). The silicon pins 10 were formed by DRIE on SOI wafer and were released in buffered HF acid. The silicon pins 10 were 525 μm thick, 1400 μm wide, and 45 mm long. The lumen 16 or capillary tract was 12 mm long while the tip contact end was 20 μm by 50 μm.

To form the hydrophobic-coated pins 10, a process of the type illustrated in FIG. 1 was followed. Specifically, a drop (1 μl) of positive photoresist (Shipley SJR 5740) was wicked into the capillary space and selectively covered the interior surface 18 of the pin. The photoresist was hardened by heating the pin 10 in an oven for around 5 minutes at 100° C. The exterior surface 14 was then coated with a hydrophobic material (either HMDS or OTS). Finally, the photoresist was dissolved by a bath of acetone, methanol, and water. It was observed that this dissolving step did not affect the exterior surface wettability of the pin 10.

Figure 3A:
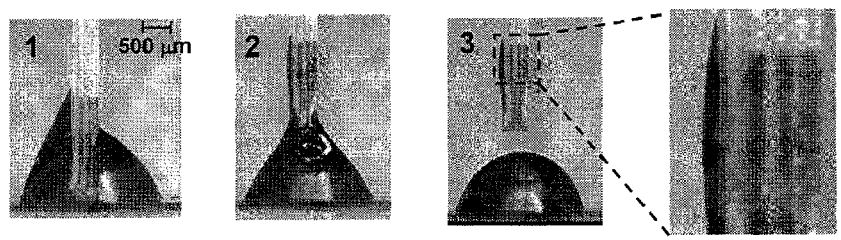
FIG. 3A illustrates a panel of photographic images taken of an untreated silicon printing pin being loaded with liquid.
Figure 3B:
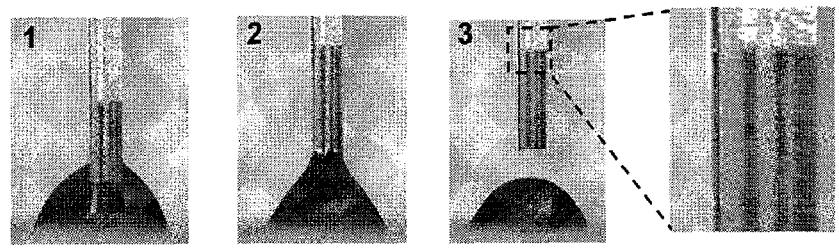
FIG. 3B illustrates a panel of photographic images taken of a selectively-treated printing pin being loaded with liquid.

The coated and un-coated silicon pins were loaded by dipping each into a 4 μl hemispherical 3×SSC droplet for ten (10) seconds. After ten seconds had expired, the pins were withdrawn from the droplets. The withdrawal of the coated and un-coated pins was recorded via video imaging. FIG. 3A illustrates a panel of photographic images taken of an untreated silicon printing pin being loaded and withdrawn from the hemispherical 3×SSC droplet. FIG. 3B illustrates a panel photographic images of a selectively-treated (with hydrophobic coat) silicon printing pin being loaded and withdrawn from the hemispherical 3×SSC droplet. As seen in FIG. 3A, the untreated pin was coated with excessive liquid on the outer surface (best seen in the magnified image on the right side of slide 3). In contrast, as seen in FIG. 3B, the pin with the hydrophobic surface was free of any excess adherent liquid. Because of the exterior surface of the treated pin is hydrophobic, there is no liquid accumulation on the exterior of the pin after withdrawal. This advantageous feature results in consistent liquid volume loading of the pin because loading level is determined only by the volume of the lumen (and optional reservoir) within the pin and is not affected by how deep the pin is inserted into the sample. A consistent volume of liquid is loaded into the pin regardless of the sample volume remaining in the microplate wells. This feature allows for a significant reduction in solution consumption.

Figure 4:
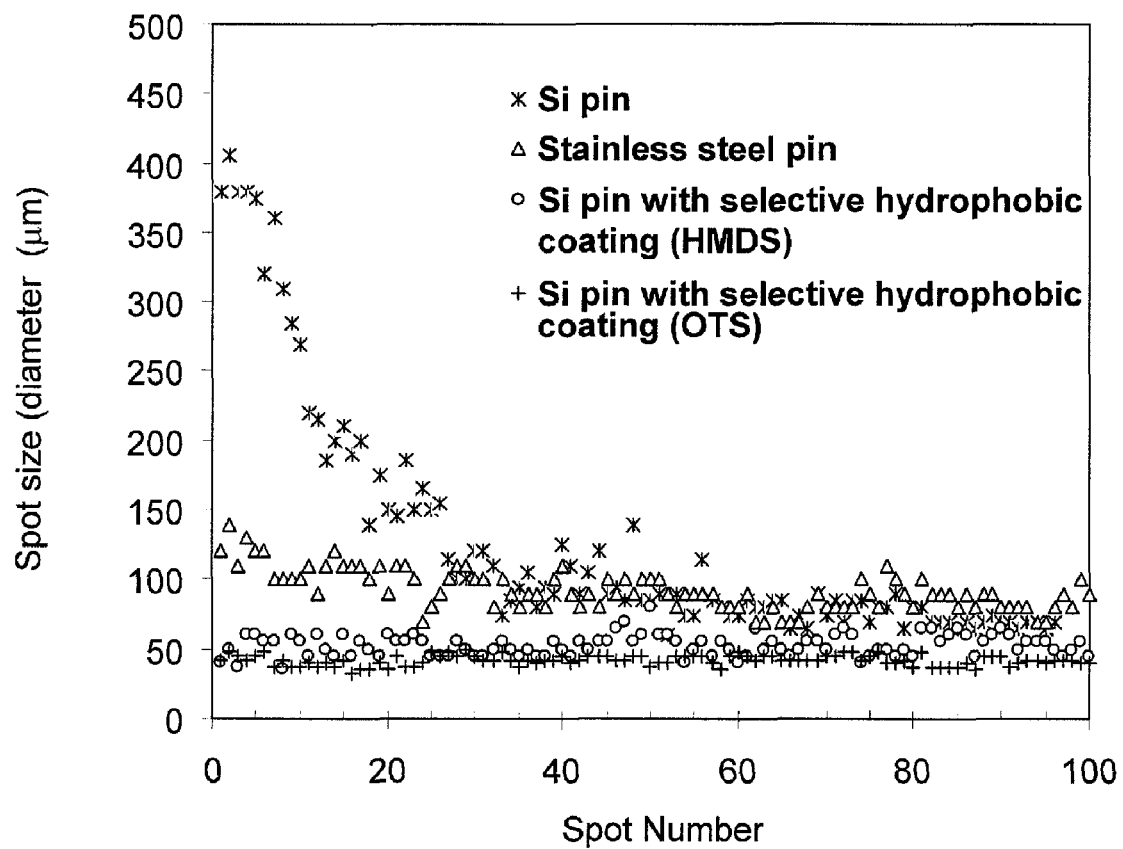
FIG. 4 illustrates a graph of the spot size as a function of spot number for four (4) different pins. One pin was formed as a stainless steel pin with no surface modifications (Δ). A second pin was formed as a silicon pin with no surface modifications (*). A third pin was formed as a silicon pin and was selectively coated with hexamethyldisilazane (HMDS) (°). A fourth pin was formed from silicon and was selectively coated with octadecyl tricholorosilane (OTS) (+).

Tests were also performed to measure the need for pre-printing in the various pins. FIG. 4 illustrates a graph of the spot size as a function of spot number for four different pins printing on a glass slide. A sessile drop of 5 μl oligonucleotide with 3×SSC buffer was loaded into each pin. One pin was a commercial stainless steel pin with no surface modifications (Δ). A second pin was a silicon-micromachined pin with no surface modifications (*). A third pin was a silicon-micromachined pin selectively coated with HMDS (°). A fourth pin was a silicon-micromachined pin selective coated with OTS (+). Spot diameter was assessed by evaluating fluoroscopic images of the printed spots. The untreated pins, both silicon and stainless steel, printed larger initial spots and required a number of pre-prints before a consistent spot size was obtained. The untreated silicon pins, due to their hydrophilic nature and geometry, tended to have more accumulation of excessive solution in the beginning of the run than the stainless-steel pins had and required approximately 30 pre-prints before a consistent spot size was achieved. In contrast, the treated silicon pins (both HMDS-coated and OTS-coated) required little or no pre-prints. The initial spots were small and had a consistent size (about 50 μm nominal diameter).

Figure 5A:
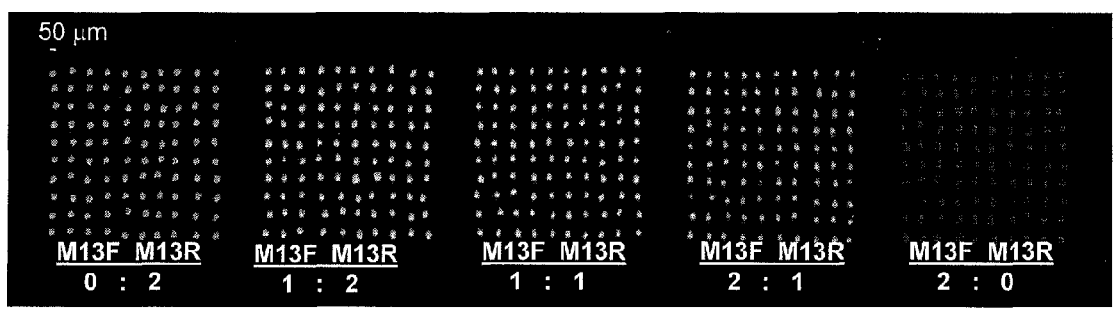
FIG. 5A illustrates a photographic image of an array of spots formed using OTS-treated pins. Two oligonucleotides, M13F and M13R, with the same concentration were mixed with ratios of 0:2, 1:2, 1:1, 2:1, and 2:0 and printed on a slide. Complementary oligonucleotides with Cy3 and Cy5 fluorescent labels attached were hybridized with the printed spots.
Figure 5B:
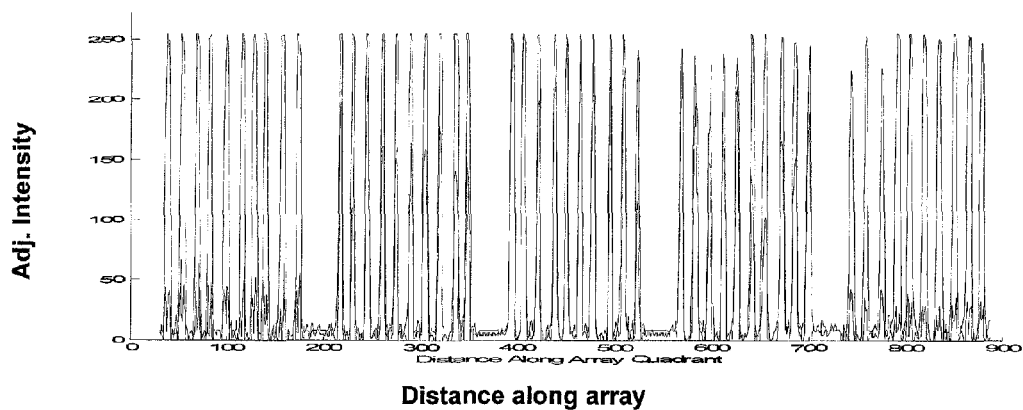
FIG. 5B illustrates a graph of the intensity of imaged fluorescent light as a function of distance along the length of the array of spots illustrated in FIG. 5A.

Additional experiments were performed to test pin effectiveness under typical robotic printing conditions. The experiments also evaluated cross-contamination. In this experiment, printing was performed with an OTS-treated silicon pin using salmon sperm DNA on poly-lysine slides (contact angle 65° with 3×SSC). The pins were loaded onto an Affymetrix 417 robotic arrayer device. Four hundred (400) spots were printed in one run with an average spot size of 38 μm. The spots were generated from five 10×10 spot arrays, using a single pin. Two color fluorescence hybridization tests were performed using complementary oligonucleotides. FIG. 5A illustrates a photographic image of an array of spots formed using OTS-treated pins. Two oligonucleotides, M13F and M13R, with the same concentration were mixed in a volumetric ratio of 0:2, 1:2, 1:1, 2:1, and 2:0 and printed on a slide. Complementary oligonucleotides with Cy3 and Cy5 fluorescent labels attached were hybridized with the printed spots. FIG. 5B illustrates a graph of the intensity of imaged fluorescent light as a function of distance along the length of the array of spots illustrated in FIG. 5A.

The data illustrated in FIGS. 5A and 5B demonstrated hybridization specificity, no detectable sample carryover, precise deposition, and reproducibility of printing. Furthermore, the total number of spots created per treated pin was increased by 60% (~800 spots) relative to the approximately 300 spots per run for untreated pins. The spot diameter ranged between 40-60 μm, depending on the size of the treated silicon pin tip. The average spot volume produced was found to be around 2 pL. The robustness of the silicon pins and the hydrophobic coating were demonstrated by long-term tests in which no damage was observed after printing 10,000 spots.

Table 1 below summarizes the characteristics of the four printing pins that were tested.

TABLE 1

|  | Preprint spots | Average spot size | Standard Deviation | Total spots printed |
|---|---|---|---|---|
| Stainless-steel pin (commercial) | 10-20 | ~100 μm | ±14 μm | 150 |
| Untreated Silicon pin | ~50 | ~63 μm | ±13 μm | 300 |
| Treated Silicon pin (HMDS) | Not required | ~48 μm | ±8 μm | >500 |
| Treated Silicon pin (OTS) | Not required | ~42 μm | ±5 μm | >500 |

By tailoring the surface energy of different regions of the printing pin, the current invention eliminates the need for pre-printing. Moreover, the pins formed in accordance with methods described herein improve the overall consistency of the spot volumes deposited onto glass surfaces. The selective surface treatment applied to the pin resulted in several benefits. One benefit is that the treated pins reduce solution or reagents use because no excess (i.e., waste) liquid is picked up by the treated pins. Similarly, no pre-printing operation is needed to remove this excess liquid. Because no pre-printing operation is needed, the pins produce shorter printing times. Finally, due to improved control of liquid loading volume, it is possible to obtain smaller spots as well as more sports in a given run.

The present invention has direct applicability to contact printing devices. However, treated pins of the type disclosed herein may also be used in non-contact printing or even injection printing applications. While embodiments of the present invention have been shown and described, various modifications may be made without departing from the scope of the present invention. The invention, therefore, should not be limited, except to the following claims, and their equivalents.

What is claimed is:

1. A printing pin comprising:
   an elongate body having an exterior surface and a lumen contained within the elongate body, the lumen being surrounded by an interior surface of the elongate body wherein the exterior surface comprises a hydrophobic material deposited thereon and the interior surface of the elongate body being hydrophilic.

2. The device of claim 1, wherein the hydrophobic material is a polymer.

3. The device of claim 1, wherein the hydrophobic material is a self-assembled monolayer.

4. The device of claim 1, wherein the hydrophilic surface comprises an oxide.

5. The device of claim 1, wherein the elongate body is formed from a ceramic.

6. The device of claim 1, wherein the elongate body is formed from a metal.

7. The device of claim 1, wherein the pin is adapted for holding within a robotic micro arrayer.

8. A method of forming a printing pin comprises:
   providing a printing pin having an exterior surface and an interior surface that defines a lumen, the interior and exterior surfaces being hydrophilic;
   filling the lumen with a blocking material;
   coating the exterior surface of the pin with a hydrophobic material; and
   removing the blocking material.

9. The method of claim 8, wherein the printing pin is treated so as to render the exterior and interior surfaces hydrophilic.

10. The method of claim 9, wherein the exterior and interior surfaces are rendered hydrophilic by treatment with an oxidizer.

11. The method of claim 8, wherein the blocking material comprises a polymer.

12. The method of claim 8, wherein the hydrophobic material is selected from the group consisting of polytetrafluoroethylene, parylene, hexamethyldisilazane, and octadecyl trichlorosilane.

13. The method of claim 8, wherein blocking material is wicked into the lumen.

14. The method of claim 8, wherein the pin is dipped in blocking material to fill the lumen and coat the exterior surface of the pin with a layer of blocking material.

15. The method of claim 14, further comprising the step of selectively removing the layer of blocking material on the exterior surface of the pin.

16. A printing pin array, wherein at least one pin of the array is formed according to the method of claim 8.

17. A method of printing comprising:
   providing a pin comprising an elongate body having an exterior surface and a lumen contained within the elongate body, the lumen being surrounded by an interior surface of the elongate body wherein the exterior surface comprises a hydrophobic material deposited thereon and the interior surface of the elongate body being hydrophilic;
   inserting the pin into fluid;
   removing the pin from the fluid, wherein the exterior surface of the elongate body is substantially free of fluid; and
   contacting the pin with a printing surface.

* * * * *

UNITED STATES PATENT AND TRADEMARK OFFICE
CERTIFICATE OF CORRECTION

PATENT NO. : 8,162,555 B2  
APPLICATION NO. : 11/458981  
DATED : April 24, 2012  
INVENTOR(S) : Kim et al.

Page 1 of 1

It is certified that error appears in the above-identified patent and that said Letters Patent is hereby corrected as shown below:

Col. 1, line 12, Replace

STATEMENT REGARDING FEDERALLY SPONSORED RESEARCH AND DEVELOPMENT

The U.S. Government may have a paid-up license in this invention and the right in limited circumstances to require the patent owner to license others on reasonable terms as provided for by the terms of grant Number CMS-99-80874 awarded by the National Science Foundation With

STATEMENT REGARDING FEDERALLY SPONSORED RESEARCH AND DEVELOPMENT

This invention was made with Government support under Grant No. 9980874 awarded by the National Science Foundation. The Government has certain rights in this invention.

Signed and Sealed this
Eighteenth Day of September, 2012

David J. Kappos
*Director of the United States Patent and Trademark Office*